(12) United States Patent
Bailey et al.

(10) Patent No.: US 10,566,677 B2
(45) Date of Patent: Feb. 18, 2020

(54) SATELLITE ANTENNA MOUNTING SYSTEMS AND METHODS

(71) Applicant: DISH Network L.L.C., Englewood, CO (US)

(72) Inventors: Matthew Bailey, Denver, CO (US); William Roberts, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 120 days.

(21) Appl. No.: 15/948,748

(22) Filed: Apr. 9, 2018

(65) Prior Publication Data

US 2019/0207292 A1 Jul. 4, 2019

Related U.S. Application Data

(60) Provisional application No. 62/611,881, filed on Dec. 29, 2017.

(51) Int. Cl.
*H01Q 1/12* (2006.01)
*F16B 45/00* (2006.01)

(52) U.S. Cl.
CPC ............. *H01Q 1/125* (2013.01); *F16B 45/00* (2013.01)

(58) Field of Classification Search
CPC ................................ H01Q 1/125; F16B 45/00
USPC ..... 248/304; 343/700 R, 878, 880, 882, 892, 343/718
See application file for complete search history.

(56) References Cited

U.S. PATENT DOCUMENTS

| | | | | |
|---|---|---|---|---|
| 6,445,361 | B2* | 9/2002 | Liu ........................ | H01Q 1/125 343/878 |
| 6,512,485 | B2* | 1/2003 | Luly ...................... | H01Q 1/247 343/753 |
| 6,873,304 | B1* | 3/2005 | Malhotra ............. | H01Q 1/1221 248/346.01 |
| 6,963,316 | B1* | 11/2005 | Lin ...................... | H01Q 1/1228 343/882 |
| 7,057,575 | B2* | 6/2006 | Malhotra ............. | H01Q 1/1221 248/346.01 |
| 7,961,155 | B2* | 6/2011 | Chen .................... | H01Q 1/1221 343/878 |
| 2005/0052335 | A1* | 3/2005 | Chen ..................... | H01Q 1/125 343/878 |
| 2019/0203880 | A1* | 7/2019 | Bailey ..................... | F16B 2/005 |
| 2019/0207292 | A1* | 7/2019 | Bailey ..................... | F16B 45/00 |

* cited by examiner

*Primary Examiner* — Todd M Epps
(74) *Attorney, Agent, or Firm* — Kilpatrick Townsend & Stockton LLP

(57) ABSTRACT

A system for coupling a satellite antenna to a mounting structure is provided. The system may include a mounting structure and a satellite antenna. The mounting structure may include a plurality of tabs extending upward, and located at a first elevation. The mounting structure may also define a first plurality of apertures located at a second elevation, where the first elevation is higher than the second elevation. The satellite antenna may define a second plurality of apertures configured to accept the plurality of tabs. The satellite antenna may be supported by the mounting structure upon the plurality of tabs being accepted by the second plurality of apertures. The satellite antenna may also define a third plurality of apertures which may be aligned with the first plurality of apertures upon the plurality of tabs being accepted by the second plurality of apertures.

20 Claims, 4 Drawing Sheets

SATELLITE ANTENNA MOUNTING SYSTEMS AND METHODS

CROSS-REFERENCE TO RELATED APPLICATIONS

This application claims priority to, and the benefit of, U.S. Provisional Application No. 62/611,881, filed Dec. 29, 2017, the entire disclosure of which is incorporated by reference, for all purposes, as if fully set forth herein.

BACKGROUND OF THE INVENTION

Various systems exist for attaching satellite antennas to mounting structures. Attaching a satellite antenna to a mounting structure is the final step in installing a satellite antenna, but can sometimes be the most troublesome.

Because of the bulky shape and weight of a satellite antenna, either multiple persons may be required to complete the installation, or at the very least, a single person may have trouble completing this final step. Furthermore, the installer may also be working at an elevated level above the ground, as is common in satellite antenna installations. Finally, existing systems may require coupling hardware between the satellite antenna and the mounting structure to be installed to complete the installation, prior to the installer removing their support of the weight of the satellite antenna.

Embodiments of the present invention provide improvements to existing systems, as well as solutions for scenarios left unresolved by existing systems.

BRIEF SUMMARY OF THE INVENTION

In one embodiment, a system for coupling a satellite antenna to a mounting structure is provided. The system may include a mounting structure and a satellite antenna. The mounting structure may include a plurality of tabs extending upward, and located at a first elevation. The mounting structure may also define a first plurality of apertures located at a second elevation, where the first elevation is higher than the second elevation. The satellite antenna may define a second plurality of apertures configured to accept the plurality of tabs. The satellite antenna may be supported by the mounting structure upon the plurality of tabs being accepted by the second plurality of apertures. The satellite antenna may also define a third plurality of apertures which may be aligned with the first plurality of apertures upon the plurality of tabs being accepted by the second plurality of apertures.

In another embodiment, a system for coupling a satellite antenna to a mounting structure is provided. The system may include a mounting structure and a satellite antenna. The mounting structure may define a first plurality of apertures and a second plurality of apertures. The mounting structure may also define a first plurality of notches, where each of the plurality of notches opens upward. The satellite antenna may define a third plurality of apertures and a fourth plurality of apertures. The satellite antenna may also include a plurality of hooked tabs, and the satellite antenna may be supported by the mounting structure upon the plurality of hooked tabs being supported in the plurality of notches. The third plurality of apertures may be aligned with the first plurality of apertures upon the plurality of hooked tabs being supported in the plurality of notches. The fourth plurality of apertures may be aligned with the second plurality of apertures upon the plurality of hooked tabs being supported in the plurality of notches.

BRIEF DESCRIPTION OF THE DRAWINGS

Embodiments of the present invention are described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to any embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced with or without these specific details.

Figure 1:
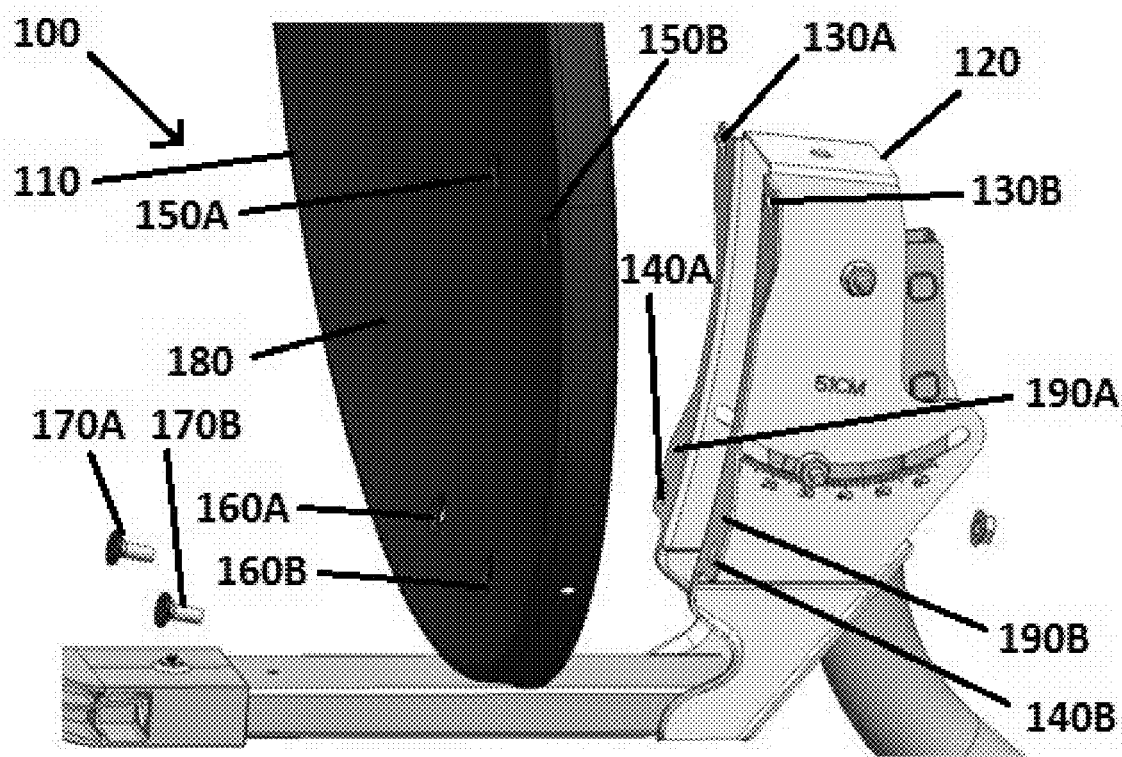
FIG. 1 illustrates a perspective view of one apparatus embodiment of the invention for coupling a satellite antenna to a mounting structure.
Figure 2:
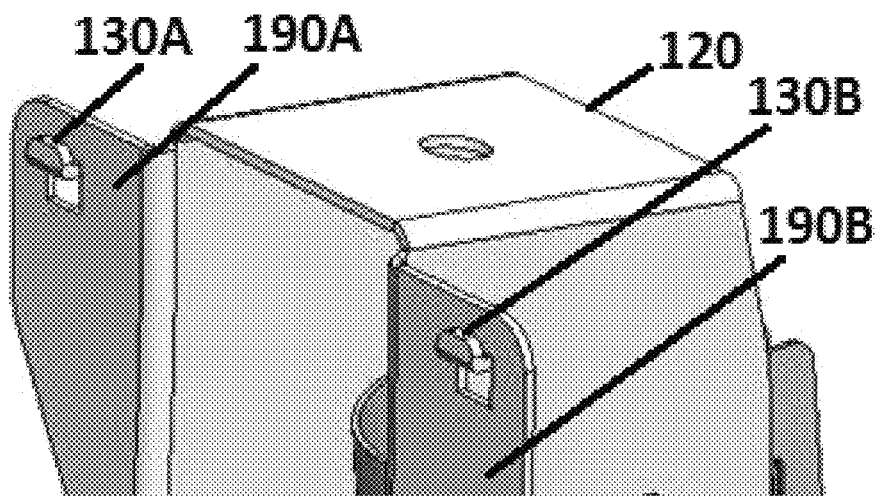
FIG. 2 illustrates a perspective view of the mounting structure from FIG. 1, without the satellite antenna.

In one embodiment, as shown in FIG. 1 and FIG. 2, a system 100 for coupling a satellite antenna 110 to a mounting structure 120 is provided. Satellite antenna 110 may be a satellite television receiving dish in some embodiments, though in other embodiments, other types of satellite antennas may be utilized. Mounting structure 120 may be the terminating portion of any mounting system which eventually secures to a substantially stationary or otherwise stable object, in order to provide a stable mounting of satellite antenna 110.

Mounting structure 120 may include a plurality of tabs 130 extending upward, and located at a consistent first elevation. Mounting structure may also define a first plurality of apertures 140 located at a consistent second elevation. As shown, the first elevation may be higher than the second elevation. Though two tabs 130 are shown in this embodiment, more may be present in other embodiments. In some embodiments, only one tab 130 may be present.

Satellite antenna 110 may define a second plurality of apertures 150 configured to accept the plurality of tabs 130. Satellite antenna 110 may be supported by mounting structure 120 upon the plurality of tabs 130 being accepted by the second plurality of apertures 150. Though two apertures 150 are shown in this embodiment, more may be present in other embodiments, and the number of apertures 150 may match the number of tabs 130. In some embodiments, only one aperture 150 may be present. The outward facing surface of tabs 130 may be substantially flush with reflection surface 180 of satellite antenna 110. "Substantially flush" shall be interpreted to mean that inconsequential differences in height are present with respect to the ultimate functionality of such surfaces.

Satellite antenna 110 may also define a third plurality of apertures 160 which may be aligned with the first plurality of apertures 140 upon the plurality of tabs 130 being accepted by the second plurality of apertures 150. Though two apertures 160 are shown in this embodiment, more may be present in other embodiments, and the number of apertures 160 may match the number of apertures 140. In some embodiments only one aperture 160 may be present.

A plurality of fasteners 170 (shown here as nuts and bolts) may also be provided. Upon the plurality of tabs 130 being accepted by the second plurality of apertures 150, the plurality of fasteners 170 may be inserted into the first plurality of apertures 140 and the third plurality of apertures 160. The end of each of the plurality of fasteners 170 may be substantially flush with reflection surface 180 of satellite antenna 110 when inserted into the first plurality of apertures 140 and the third plurality of apertures 160.

In addition to vertically supporting satellite antenna 110, tabs 130 may also limit lateral (i.e., left to right) movement of satellite antenna 110 once engaged with apertures 150. This may be accomplished by making the width of tabs 130 substantially equal to the width of apertures 150. "Substantially equal" shall be interpreted to mean that routine mechanical clearances are maintained for mating parts.

Mounting structure 120 may also include a backing surface 190. Backing surface 190 may be substantially congruent with the back of the satellite antenna 110, such that upon the plurality of tabs 130 being accepted by the second plurality of apertures 150, backing surface 190 is substantially flush with the back of satellite antenna 110. This may assist in stabilizing satellite antenna 110 against mounting structure 120.

Figure 3:
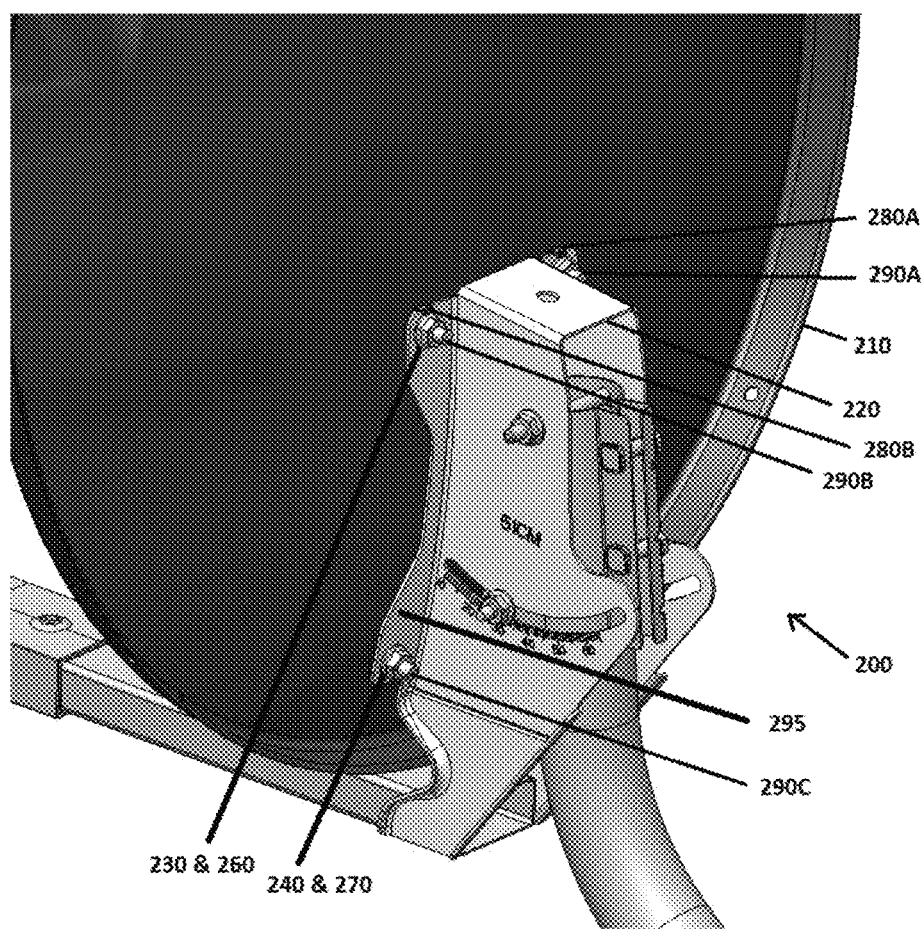
FIG. 3 illustrates a perspective view of another apparatus embodiment of the invention for coupling a satellite antenna to a mounting structure.
Figure 4:
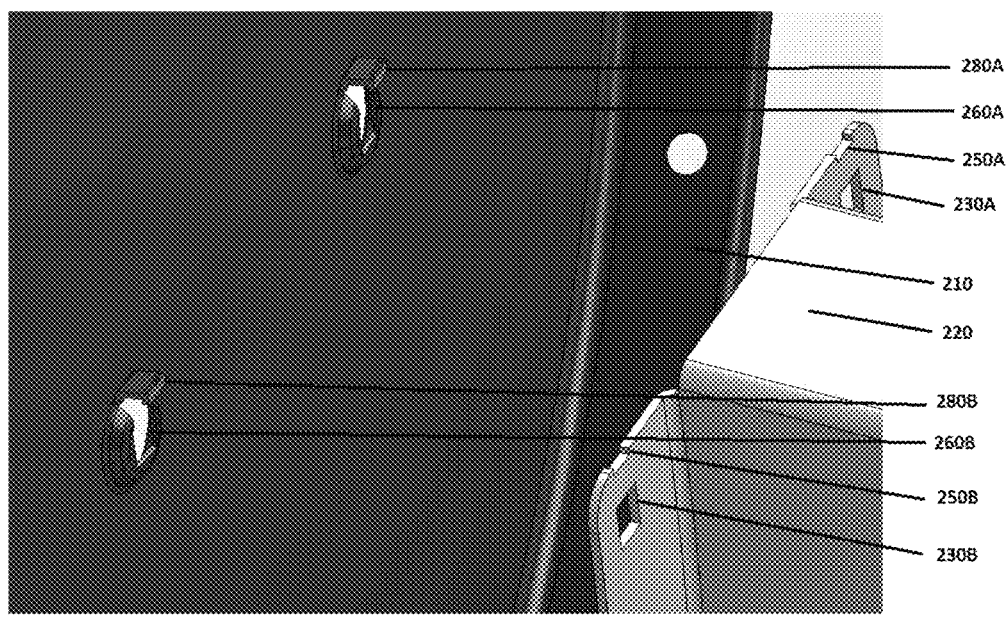
FIG. 4 illustrates a perspective view of the apparatus from FIG. 2, without the satellite antenna coupled to the mounting structure.

In another embodiment, as shown in FIG. 3 and FIG. 4, a system 200 for coupling a satellite antenna 210 to a mounting structure 220 is provided. Satellite antenna 210 may be a satellite television receiving dish in some embodiments, though in other embodiments, other types of satellite antennas may be utilized. Mounting structure 220 may be the terminating portion of any mounting system which eventually secures to a substantially stationary or otherwise stable object, in order to provide a stable mounting of satellite antenna 210.

Mounting structure 220 may define a first plurality of apertures 230 and a second plurality of apertures 240. The mounting structure may also define a first plurality of notches 250, where each of the plurality of notches 250 opens upward. Though two apertures 230 and two apertures 240 are shown in this embodiment, more may be present in other embodiments. In some embodiments, only one each of aperture 230, 240 may be present.

Satellite antenna 210 may define a third plurality of apertures 260 and a fourth plurality of apertures 270. Satellite antenna 210 may also include a plurality of hooked tabs 280, and satellite antenna 210 may be supported by mounting structure 220 upon the plurality of hooked tabs 280 being supported in the plurality of notches 250. Though two apertures 260 and two apertures 270 are shown in this embodiment, more may be present in other embodiments. In some embodiments, only one each of aperture 260, 270 may be present. The number of apertures 230 and apertures 260 may be the same in most embodiments. The number of apertures 240 and apertures 270 may be the same in most embodiments.

Third plurality of apertures 260 may be aligned with the first plurality of apertures 230 upon the plurality of hooked tabs 280 being supported in the plurality of notches 250. The fourth plurality of apertures 270 may be aligned with the second plurality of apertures 240 upon the plurality of hooked tabs 280 being supported in the plurality of notches 250. Though two hooked tabs 280 and two notches 250 are shown in this embodiment, more may be present in other embodiments, in some embodiments, only one hooked tab 280 and one notch 250 may be present. The number of hooked tabs 280 and notches 250 may be the same in most embodiments.

A plurality of fasteners 290 (shown here as nuts and bolts) may also be provided. Upon the plurality of hooked tabs 280 being supported by the plurality of notches 250, a first portion of the plurality of fasteners 290 may be inserted into the first plurality of apertures 230 and the third plurality of apertures 260, and a second portion of the plurality of fasteners 290 may be inserted into the second plurality of apertures 240 and the fourth plurality of apertures 270. The end of each of the plurality of fasteners 290 may be substantially flush with reflection surface of satellite antenna 210 when inserted into the apertures.

In addition to vertically supporting satellite antenna 210, hooked tabs 280 may also limit lateral (i.e., left to right) movement of satellite antenna 210 once engaged with notches 250. This may be accomplished by making the width of hooked tabs 280 substantially equal to the width of notches 250.

Mounting structure 220 may also include a backing surface 295. Backing surface 295 may be substantially congruent with the back of the satellite antenna 210, such that upon the plurality of hooked tabs 280 being accepted by the plurality of notches 250, backing surface 295 is substantially flush with the back of satellite antenna 210. This may assist in stabilizing satellite antenna 210 against mounting structure 220.

Various embodiments of the invention have now been described in detail for the purposes of clarity and understanding. However, it will be appreciated that certain changes and modifications may be practiced within the scope of the appended claims.

What is claimed is:

1. A system for coupling a satellite antenna to a mounting structure, wherein the system comprises:
    a mounting structure, wherein:
        the mounting structure comprises a plurality of tabs extending upward;
        the plurality of tabs are located at a first elevation;
        the mounting structure defines a first plurality of apertures;
        the first plurality of apertures are located at a second elevation; and the first elevation is higher than the second elevation; and a satellite antenna, wherein:
the satellite antenna defines a second plurality of apertures;
the second plurality of apertures are configured to accept the plurality of tabs;
the satellite antenna is supported by the mounting structure upon the plurality of tabs being accepted by the second plurality of apertures;
the satellite antenna defines a third plurality of apertures; and
the third plurality of apertures are aligned with the first plurality of apertures upon the plurality of tabs being accepted by the second plurality of apertures.

2. The system for coupling a satellite antenna to a mounting structure of claim 1, wherein the system further comprises:
a plurality of fasteners, wherein upon the plurality of tabs being accepted by the second plurality of apertures, the plurality of fasteners are capable of being inserted into the first plurality of apertures and the third plurality of apertures.

3. The system for coupling a satellite antenna to a mounting structure of claim 2, wherein:
a first end of each of the plurality of fasteners is substantially flush with a reflection surface of the satellite antenna when inserted into the first plurality of apertures and the third plurality of apertures.

4. The system for coupling a satellite antenna to a mounting structure of claim 1, wherein:
the plurality of tabs includes no more than two tabs.

5. The system for coupling a satellite antenna to a mounting structure of claim 4, wherein:
the second plurality of apertures includes no more than two apertures.

6. The system for coupling a satellite antenna to a mounting structure of claim 1, wherein:
the first plurality of apertures includes no more than two apertures.

7. The system for coupling a satellite antenna to a mounting structure of claim 6, wherein:
the third plurality of apertures includes no more than two apertures.

8. The system for coupling a satellite antenna to a mounting structure of claim 1, wherein:
each of the plurality of tabs is of a first width; and
each of the second plurality of apertures has a second width; and
the first width is substantially equal to the second width.

9. The system for coupling a satellite antenna to a mounting structure of claim 1, wherein:
the mounting structure further comprises a backing surface substantially congruent with a back of the satellite antenna, wherein upon the plurality of tabs being accepted by the second plurality of apertures, the backing surface is substantially flush with the back of the satellite antenna.

10. The system for coupling a satellite antenna to a mounting structure of claim 1, wherein:
at least one surface of each of plurality of tabs is substantially flush with a reflection surface of the satellite antenna upon the plurality of tabs being accepted by the second plurality of apertures.

11. A system for coupling a satellite antenna to a mounting structure, wherein the system comprises:
a mounting structure, wherein:
the mounting structure defines a first plurality of apertures;
the mounting structure defines a second plurality of apertures; and
the mounting structure defines a first plurality of notches, wherein each of the plurality of notches opens upward; and a satellite antenna, wherein:
the satellite antenna defines a third plurality of apertures;
the satellite antenna defines a fourth plurality of apertures;
the satellite antenna comprises a plurality of hooked tabs;
the satellite antenna is supported by the mounting structure upon the plurality of hooked tabs being supported in the plurality of notches;
the third plurality of apertures are aligned with the first plurality of apertures upon the plurality of hooked tabs being supported in the plurality of notches; and
the fourth plurality of apertures are aligned with the second plurality of apertures upon the plurality of hooked tabs being supported in the plurality of notches.

12. The system for coupling a satellite antenna to a mounting structure of claim 11, wherein the system further comprises:
a plurality of fasteners, wherein upon the plurality of hooked tabs being supported in the plurality of notches, a first portion of the plurality of fasteners are capable of being inserted into the first plurality of apertures and the third plurality of apertures, and a second portion of the plurality of fasteners are capable of being inserted into the second plurality of apertures and the fourth plurality of apertures.

13. The system for coupling a satellite antenna to a mounting structure of claim 11, wherein:
the plurality of notches are located above the first plurality of apertures.

14. The system for coupling a satellite antenna to a mounting structure of claim 13, wherein:
the first plurality of notches are located above the second plurality of apertures.

15. The system for coupling a satellite antenna to a mounting structure of claim 11, wherein:
each of the plurality of hooked tabs is of a first width; and
each of the second plurality of notches has a second width; and
the first width is substantially equal to the second width.

16. The system for coupling a satellite antenna to a mounting structure of claim 11, wherein:
the mounting structure further comprises a backing surface substantially congruent with a back of the satellite antenna, wherein upon the plurality of hooked tabs being supported in the plurality of notches, the backing surface is substantially flush with the back of the satellite antenna.

17. The system for coupling a satellite antenna to a mounting structure of claim 11, wherein:
the plurality of hooked tabs includes no more than two hooked tabs.

18. The system for coupling a satellite antenna to a mounting structure of claim 11, wherein:
the plurality of notches includes no more than two notches.

19. The system for coupling a satellite antenna to a mounting structure of claim 11, wherein:

the first plurality of apertures includes no more than two apertures; and the third plurality of apertures includes no more than two apertures.

20. The system for coupling a satellite antenna to a mounting structure of claim 11, wherein:

the second plurality of apertures includes no more than two apertures; and the fourth plurality of apertures includes no more than two apertures.

* * * * *